WRAPPING MECHANISM AND A METHOD OF WRAPPING ARTICLES
Original Filed July 20, 1956 2 Sheets-Sheet 1
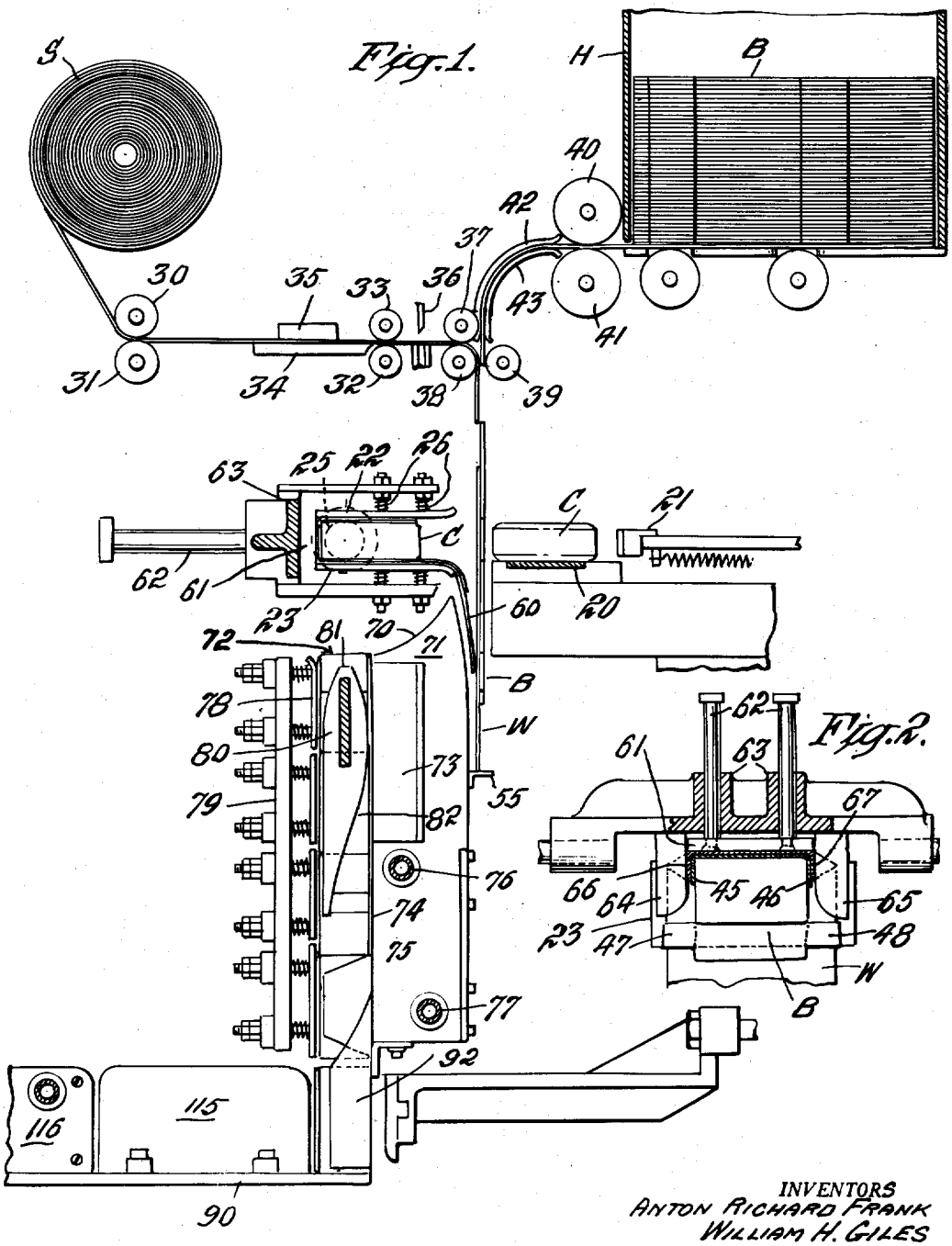
INVENTORS
ANTON RICHARD FRANK
WILLIAM H. GILES
BY Luther W. Hawley.
ATTORNEY

WRAPPING MECHANISM AND A METHOD OF WRAPPING ARTICLES

Original Filed July 20, 1956 2 Sheets-Sheet 2

INVENTORS
ANTON RICHARD FRANK
WILLIAM H. GILES
BY Luther W. Hawley
ATTORNEY

United States Patent Office

Re. 25,040
Reissued Sept. 19, 1961

25,040

WRAPPING MECHANISM AND A METHOD OF WRAPPING ARTICLES

Anton Richard Frank, Jamaica, and William H. Giles, Brooklyn, N.Y., assignors, by mesne assignments, to Van Buren Machine Corp., Brooklyn, N.Y., a corporation of New York Original No. 2,911,774, dated Nov. 10, 1959, Ser. No. 599,227, July 20, 1956. Application for reissue Nov. 1, 1960, Ser. No. 66,682
5 Claims. (Cl. 53—27)

Matter enclosed in heavy brackets [ ] appears in the original patent but forms no part of this reissue specification; matter printed in italics indicates the additions made by reissue.

This invention relates to wrapping mechanism, such as machines for wrapping articles of irregular shape, as, for instance, oval articles, and to a method of wrapping such articles.

It has been found difficult to form a neat, tight, wrap around articles of irregular shape and this invention has for its salient object to provide a method of wrapping such articles and means whereby regular or standard wrapping mechanism such as is now used to wrap articles such as cakes of soap, can be utilized to fold a box blank around the article at the same time the wrapper is folded and sealed, thereby providing a neat, tight, wrap.

Further objects of the invention will appear from the following specification taken in conntion with the drawings which form a part of this application, and in which—

FIG. 1 is a vertical, sectional elevation through a wrapping machine constructed in accordance with the invention;

FIG. 2 is a fragmentary sectional elevation through the tumbler box shown in FIG. 1, after the box has been rotated to vertical position;

Figure 3:
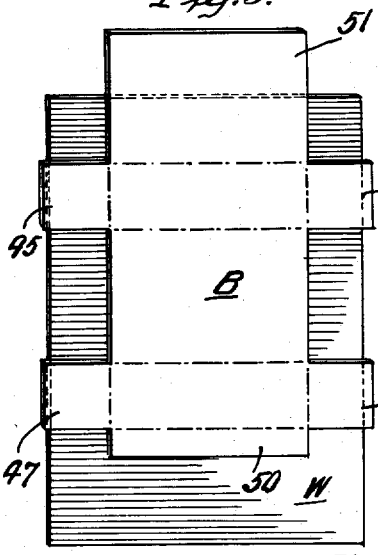
FIG. 3 is a plan view of the wrapper sheet having superposed thereon a box blank.

The invention, briefly described, consists of mechanism for superposing a box blank on a wrapper sheet, and so positioning and holding the blank relative to the sheet that the folding and wrapping means formerly used to wrap the sheet around and article will simultaneously operate to fold the box blank around the article and fold the wrapper sheet around the box so formed.

Further details of the invention will appear from the following description.

The wrapping machine illustrated in FIGS. 1 and 2 is similar to that disclosed in Van Buren Patent No. 1,746,448 and in applicant's Patent No. 2,915,867.

As shown in FIG. 1, the articles, such as cakes C of soap, or, if desired, other articles, are fed from a table or support 20 by a plunger or pusher 21 between plates 22 and 23 of a tumbler box or pocket which is oscillatable upon a horizontal pivot 25. The plates 22 and 23 are spring pressed inwardly by springs 26.

The wrapper is carried by a supply roll S and is guided by rolls 30 and 31 and rolls 32 and 33 over a table 34 beneath a heater 35. The wrapper sheet has a porous outer surface on its inner side and inside of the porous surface there is a layer of wax. As the wrapper passes beneath the heater 35, the wax is melted or softened. From the rolls 32 and 33 the wrapper strip passes beneath a knife 36, which severs the strip into sheets, and the sheet is fed between feed rolls 37 and 38 and downwardly between rolls 38 and 39.

As the wrapper sheet passes downwardly, it is superposed on a box blank, shown in FIG. 3 at B. The wrapper sheet is designated in FIG. 3 as W.

The box blanks B are mounted in a magazine or hopper H and are fed from the hopper between feed rolls 40 and 41 into a channel formed by arcuate plates 42 and 43 which guides the blank downwardly to a position between the rolls 38 and 39, where the blank is engaged by the wrapper sheet.

It is very important for the successful operation of the machine that the box blank B and the wrapper sheet W be accurately positioned relative to each other. In the form of the invention shown in FIG. 1, this is acplished by pressing the wrapper sheet W against the box blank, whereupon the softened wax on the upper surface of the sheet, viewing FIG. 1, will engage the blank and secure the blank in position relative to the sheet.

The blank B has two sets of laterally extending tabs 45 and 46 and 47 and 48. These tabs, when folded, form the ends of the box. The main body of the blank extends, as shown at 50, beyond the outer edges of the tabs 47 and 48 and has a longer extension 51 beyond the outer edges of the tabs 45 and 46 at the other end of the blank.

As shown in FIG. 1, a stop 55 is provided to limit the downward movement of the wrapper W when the wrapper and box blank attached thereto have been released from between the feed rolls 38 and 39.

When the wrapper and box blank are positioned as shown in FIG. 1, the cake C is pushed to the left and forces the wrapper sheet W and box blank into the pocket of the tumbler box between the plates 22 and 23. In this manner the wrapper and box blank are folded around the two faces and the inner end of the article C and project beyond the plate 23, as shown at 60.

As shown in FIG. 2, the inner end of the pocket is formed by a head 61 which is mounted on plunger rods 62 which are slidable in a plunger box mounting 63 to eject the article and wrapper into a vertical folding channel after the tumbler box has been rotated through 90° in a clockwise direction, viewing FIG. 1. The plunger box 63 has laterally projecting flanges 64 and 65 which engage the outwardly projecting ends of the wrapper and form tucks 66 and 67 therein. At the same time that these tucks are formed, the tabs 45 and 46 are folded inwardly against the ends of the cake C.

Thus, after the cake and wrapper and box blank are pushed into the tumbler box, end tucks are formed at one edge of the cake, the tabs 45 and 46 are folded against the ends of the cake, and the wrapper and box are folded around the two faces and inner end of the cake, the projecting end of the wrapper extending beyond the plate 23, as shown in FIG. 1.

As the tumbler box is rotated through 90° to vertical position, the projecting end 60 will rest against the upper surface 70 of a block 71 at one side of the verttical channel 72 through which the cake and wrapper and box blank are pushed.

A heater plate or block 73 is mounted in the block 71, as shown in FIG. 1, and below the heater block the side of the channel is formed by a plate 74 which forms one wall of a chamber 75 through which cooling fluid is circulated through pipes 76 and 77.

The other wall of the channel through which the cakes and wrapper are fed is formed by a series of spring pressed plates 78 which are slidably mounted on a supporting plate or bar 79. At the sides of the channel are secured plates 80 which have upwardly extending fingers 81 and also have an undulating folding edge 82.

As the cakes, wrapper and box blank are fed downwardly into the channel, the fingers 81 form the lower tucks 83 and 84 and at the same time fold the tabs 47 and 48 against the ends of the cake.

Figure 7:
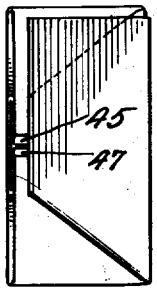
FIG. 7 is a view similar to FIG. 6 but showing the next stage of the folding operation in which one of the end folds has been folded across the end of the article.
Figure 5:
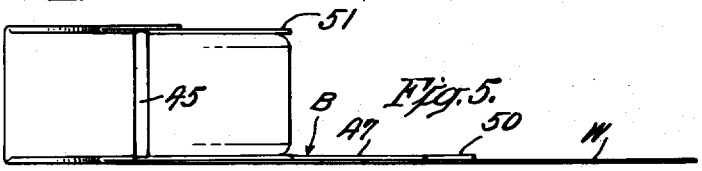
FIG. 5 is an end elevation showing the article, wrapper sheet and blank in the second stage of the folding operation.

After the tucks have been formed there are two outwardly projecting flaps at each end of the cake and the flaps projecting beyond one surface of the cake are folded, as shown in FIG. 7, by the folding edge 82, and are held in this position as the cake moves downwardly from the guide channel to the table 90 by side plates 91 and 92.

Figure 4:
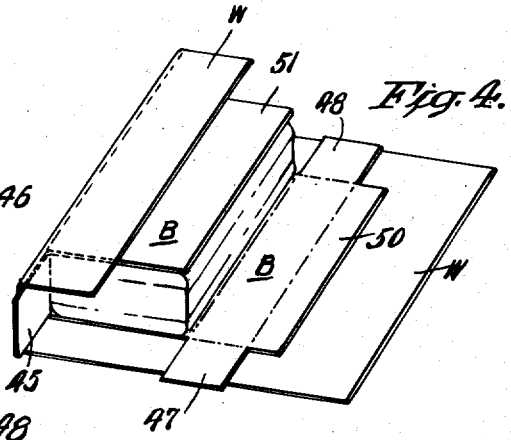
FIG. 4 is a perspective elevational view showing the wrapper sheet and blank folded around the article in the first wrapping position.
Figure 6:
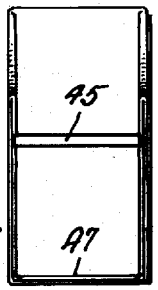
FIG. 6 is an end elevation in the next stage of the folding operation, showing the tabs on the blank folded against one end of the cake.
Figure 11:
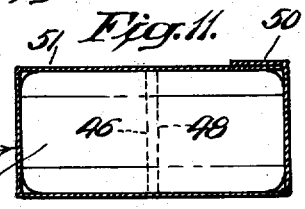
FIG. 11 is a sectional elevation of the cake and the inner box blank folded around the cake.

By referring to FIGS. 3 to 8 inclusive, the successive folding operations of the wrapper and box blank can be followed. In FIG. 4 these parts are shown in the position taken as the cake, blank and wrapper are fed into the pocket. When the cake reaches the inner end of the pocket, the tabs 45 and 46 will be folded against the ends of the cake and the inner end tucks will be formed. Thereafter, after the pocket has been rotated through 90° and the cake, wrapper and blank are fed into the vertical channel, the end tucks will be formed against the other portion of the ends of the cake and the tabs 47 and 48 will also be folded inwardly. The projecting portion 50 will fold over the outer surface of the edge of the projecting portion 51, thus accurately determining the shape of the box and holding the box blank in folded position, as shown in FIG. 11.

Figure 8:
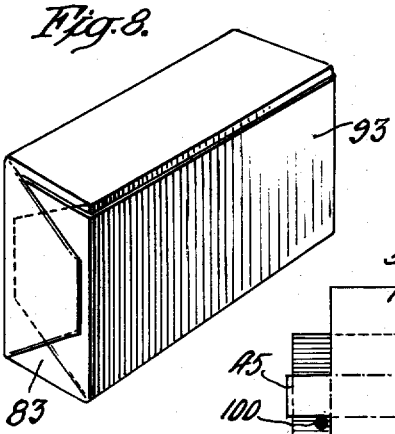
FIG. 8 is a perspective elevation showing the completely wrapped package.

It will be noted, moreover, that in the completed wrap shown in FIG. 8, the portion 93 extends substantially across the face of the article, thus providing a smooth uninterrupted surface for printing or advertising material.

Figure 9:
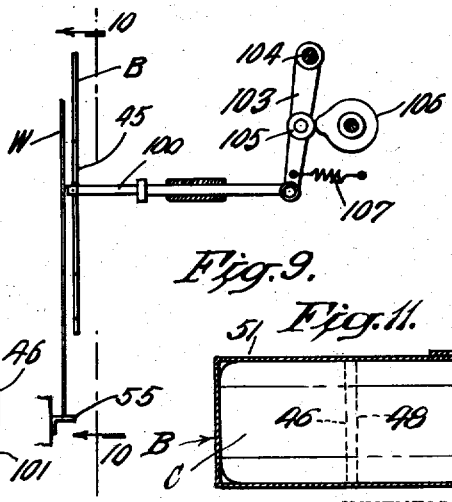
FIG. 9 is a diagrammatic elevational view showing stop means for properly positioning the box blank relative to the wrapper sheet.
Figure 10:
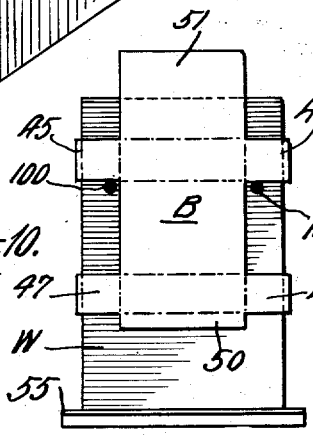
FIG. 10 is a sectional elevation taken substantially on line 10—10 of FIG. 9, looking in the direction of the arrows.

Instead of securing the box blank to the wrapper as shown and described in connection with FIG. 1, the box blank may be positioned by providing plungers 100 and 101 which are movable to engage the under surfaces of the tabs 45 and 46 in the manner shown in FIGS. 9 and 10. The plungers 100 and 101 may be connected at their rear ends to links 103 mounted on a fixed pivot 104 and having intermediate the ends thereof a roller 105 engaged by a cam 106. The roller or rollers, if desired, may be held against the cam or cams by a spring 107.

When the wrapper is folded around the cake as the cake moves into the tumbler box, and when the cake and wrapper are fed into the vertical channel, the ends of the wrapper are overlapped and these overlapped ends are pushed along the surface of a heater block 73. This causes the wax to melt and to pass through the porous tissue and to seal the overlapped ends of the wrapper together. The cake is then pushed downwardly so that the overlapped ends engage the cooling plate 74, which cools the wax and completes the seal. Thus, the overlapped ends of the wrapper are securely and tightly sealed before the ends of the wrapper are sealed against the ends of the cake. After the cake has been pushed downwardly to the support or platform 90, one set of end flaps has been folded against the ends of the cake, and as the cake and wrapper are then pushed along the support or platform, the folded flaps pass between heating plates or blocks 115 and thereafter between cooling blocks 116, thus sealing and cooling the remaining folded flaps, forming a tight wrapper on the cake.

From the foregoing specification it will be clear that a box and wrapper can be folded simultaneously and by the same folding mechanism around an article of irregular shape to enclose the article in a box around which the wrapper can be neatly and tightly folded. Thus, the same folding mechanism can be used to form the box and fold the wrapper.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What we claim is:

1. In a wrapping machine, means for feeding a wrapper sheet, means for feeding a box blank in juxtaposition to said wrapper sheet, said box blank having two sets of laterally extending tabs adapted to close the ends of the box, means for positioning and holding the box blank in definite, predetermined relation to the wrapper sheet with the wrapper sheet extending beyond and overlapping the major portion of the box blank at one end of the blank and the box blank extending beyond and overlapping the wrapper sheet at the other end of the box blank, means engaging the said laterally extending tabs for securing the box blank against relative movement in said predetermined relative position with respect to the sheet, means for folding the wrapper sheet and blank around the article, means engageable with the wrapper sheet for forming end tucks and simultaneously folding one set of tabs, means engageable with the wrapper sheet for forming another set of end tucks and simultaneously folding the other set of blank tabs against the ends of the article, and means for folding one of the projecting ends of the wrapper sheet against the ends of the box and for folding and securing the other projecting ends of the wrapper sheet against the other folded ends.

2. A method of packaging an article which consists of superposing a box blank having two sets of laterally projecting tabs on a wrapper sheet and sealing the blank and sheet in a predetermined superposed relation against relative movement between the box blank and wrapper sheet with the wrapper sheet extending beyond and overlapping the major portion of the box blank at one end of the blank and the box blank extending beyond and overlapping the wrapper sheet at the other end of the blank, folding the blank and wrapper sheet around an article to be wrapped with the ends of the blank and the ends of the wrapper sheet overlapping, simultaneously forming end tucks in the wrapper in the projecting ends of the wrapper, and folding the tabs of the box blank against the ends of the article, and completing and folding and sealing the wrapper ends around the box and article.

*3. A method of packaging an article which consists of superposing a box blank having two sets of laterally projecting tabs on a wrapper sheet and holding the blank and sheet in a predetermined superposed relation against relative movement between the box blank and wrapper sheet with the wrapper sheet extending beyond and overlapping the major portion of the box blank at one end of the blank and the box blank extending beyond and overlapping the wrapper sheet at the other end of the blank, folding the blank and wrapper sheet around an article to be wrapped with the ends of the blank and the ends of the wrapper sheet overlapping, simultaneously forming end tucks in the wrapper in the projecting ends of the wrapper, and folding the tabs of the box blank against the ends of the article, and completing and folding and sealing the wrapper ends around the box and article.*

*4. In a wrapping machine, means for feeding a wrapper sheet, means for feeding a box blank in juxtaposition to*

*said wrapper sheet, said box blank having two sets of laterally extending tabs adapted to close the ends of the box, means for positioning and holding the box blank in definite, predetermined relation to the wrapper sheet with the wrapper sheet extending beyond and overlapping the major portion of the box blank at one end of the blank and the box blank extending beyond and overlapping the wrapper sheet at the other end of the box blank, means for folding the wrapper sheet and blank around the article, means engageable with the wrapper sheet for forming end tucks and simultaneously folding one set of blank tabs against the ends of the article, means engageable with the wrapper sheet for forming another set of end tucks and simultaneously folding the other set of blank tabs against the ends of the article, and means for folding one of the projecting ends of the wrapper sheet against the ends of the box and for folding and securing the other projecting ends of the wrapper sheet against the other folded ends.*

*5. In a wrapping machine, means for feeding a wrapper sheet, means for feeding a box blank in juxtaposition to said wrapper sheet, said box blank having two sets of laterally extending tabs adapted to close the ends of the box, means engaging the said laterally extending tabs for securing the box blank against relative movement in said*

*predetermined position with respect to the sheet with the wrapper sheet extending beyond and overlapping the major portion of the box blank at one end of the box blank and the box blank extending beyond and overlapping the wrapper sheet at the other end of the box blank, means for folding the wrapper sheet and blank around the article, means engageable with the wrapper sheet for forming end tucks and simultaneously folding one set of tabs, means engageable with the wrapper sheet for forming another set of end tucks and simultaneously folding the other set of blank tabs against the ends of the article, and means for folding one of the projecting ends of the wrapper sheet against the ends of the box and for folding and securing the other projecting ends of the wrapper sheet against the other folded ends.*

References Cited in the file of this patent or the original patent

UNITED STATES PATENTS

| | | |
|---|---|---|
| 503,777 | Sutton | Aug. 22, 1893 |
| 1,247,364 | Bracy | Nov. 20, 1917 |
| 1,746,448 | Van Buren | Feb. 11, 1930 |
| 1,775,027 | Hartmann | Sept. 2, 1930 |